United States Patent
Aoki

(10) Patent No.: US 10,839,499 B2
(45) Date of Patent: Nov. 17, 2020

(54) IMAGE PROCESSING APPARATUS AND SUPERIMPOSED IMAGE GENERATION METHOD

(71) Applicant: Sony Interactive Entertainment Inc., Tokyo (JP)

(72) Inventor: Sachiyo Aoki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 121 days.

(21) Appl. No.: 16/305,435

(22) PCT Filed: Feb. 16, 2017

(86) PCT No.: PCT/JP2017/005717
§ 371 (c)(1),
(2) Date: Nov. 29, 2018

(87) PCT Pub. No.: WO2017/217011
PCT Pub. Date: Dec. 21, 2017

(65) Prior Publication Data
US 2019/0355107 A1 Nov. 21, 2019

(30) Foreign Application Priority Data
Jun. 16, 2016 (JP) ................. 2016-120299

(51) Int. Cl.
*G06T 5/50* (2006.01)
*G06T 5/10* (2006.01)
*G06T 5/00* (2006.01)

(52) U.S. Cl.
CPC ............... *G06T 5/50* (2013.01); *G06T 5/009* (2013.01); *G06T 5/10* (2013.01); *G09G 2320/0646* (2013.01); *G09G 2360/16* (2013.01)

(58) Field of Classification Search
CPC .................................. G06T 5/00; G06T 5/50
See application file for complete search history.

(56) References Cited

U.S. PATENT DOCUMENTS 9,672,603 B2   6/2017 Koike
2004/0095358 A1* 5/2004 Takagi ................ H04N 21/485
                                                              345/589
(Continued)

FOREIGN PATENT DOCUMENTS

EP    2230662 A2    9/2010
JP   2012247873 A   12/2012
(Continued)

OTHER PUBLICATIONS

International Search Report for corresponding PCT Application No. PCT/JP2017/005717, 4 pages, dated May 16, 2017.
(Continued)

*Primary Examiner* — John J Lee
(74) *Attorney, Agent, or Firm* — Matthew B. Dernier, Esq.

(57) ABSTRACT

During a period in which it is necessary to display two or more images in a superimposed manner, an image generation block of an information processing apparatus supplies the data of the image concerned to a superimposition processing block. A first image acquisition block and a second image acquisition block of the superimposition processing block acquire a first image and a second image, respectively, to be displayed in a superimposed manner. A luminance range adjustment block adjusts at least one luminance range as required with amount of adjustment corresponding to an alpha ($\alpha$) value set to the second image. An output value computation block executes the computation of alpha blending by use of the image after adjustment so as to determine
(Continued)

the pixel value of a display image, thereby outputting the determined pixel value to an image output block.

8 Claims, 10 Drawing Sheets

(56) References Cited

U.S. PATENT DOCUMENTS

| | | | |
|---|---|---|---|
| 2006/0274206 A1 | 12/2006 | Jang | |
| 2010/0201709 A1* | 8/2010 | Yang | H04N 5/58 |
| | | | 345/629 |
| 2011/0063325 A1* | 3/2011 | Saunders | G09G 5/00 |
| | | | 345/639 |
| 2012/0301050 A1 | 11/2012 | Wakazono | |
| 2015/0213586 A1* | 7/2015 | Koike | G06T 5/007 |
| | | | 382/284 |

FOREIGN PATENT DOCUMENTS

| | | |
|---|---|---|
| JP | 2013044959 A | 3/2013 |
| JP | 2015141333 A | 8/2015 |
| JP | 2016058889 A | 4/2016 |

OTHER PUBLICATIONS

International Preliminary Report on Patentability and Written Opinion for corresponding PCT Application No. PCT/JP2017/005717, 14 pages, dated Oct. 18, 2018.
Extended European Search Report for corresponding EP Application No. 17812920, 8 pages, dated Nov. 4, 2019.

* cited by examiner

FIG.13
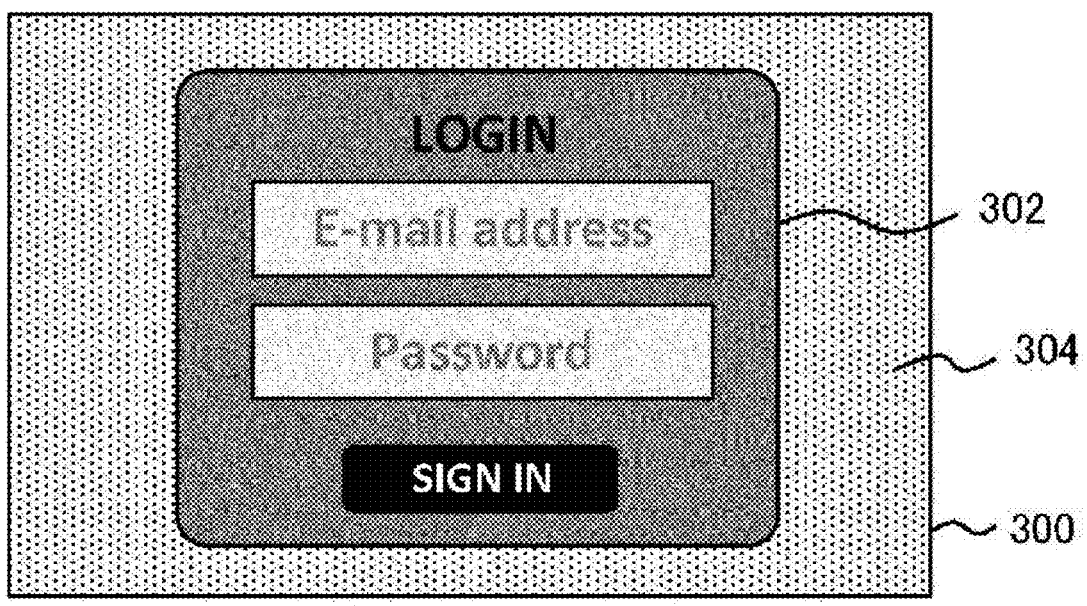

IMAGE PROCESSING APPARATUS AND SUPERIMPOSED IMAGE GENERATION METHOD

TECHNICAL FIELD

The present invention relates an image processing apparatus and a superimposed image generation method that are configured to display two or more pieces of image data in a superimposed manner.

BACKGROUND ART

Various kinds of technologies have been developed in order to enhance the image quality in video display in television broadcasting and distribute moving images. These days, in addition to the technologies of enhancing resolutions and color gamut, technologies of processing signals of HDR (High Dynamic Range) with luminance range extended is gaining popularity. As compared with conventional SDR (Standard Dynamic Range), HDR has approximately 100 times greater allowable range of luminance, so that an object that is glaring in a real world such as the reflection beam of solar light can be represented more really also on an image.

SUMMARY

Technical Problems

In not only television broadcasting and distributed moving images but also the world of computer graphics such as game images, realizing the image representation of HDR allows a virtual world more realistic. On the other hand, especially in the case of content that requires the presentation of various kinds of information such as with games, it is desired to display, according to circumstances, various kinds of information such as dialog boxes, help screens, control panels, and indicators as superimposed on a main image. In this case, display technologies are required that a world view pursuing the reality expressed by the main image is not hampered by the hiding and, at the same time, the necessary information can be visually recognized at a glance.

Therefore, the present invention addresses the above-identified and other problems associated with related-art methods and apparatuses and solves the addressed problems by providing a technology that realizes a superimposition display screen well balanced in two or more images regardless of the difference between luminance ranges.

Solution to Problems

In carrying out the present invention and according to one aspect thereof, there is provided an image processing apparatus. The image processing apparatus has a first image acquisition block configured to acquire data of a first image, a second image acquisition block configured to acquire data of a second image to be displayed on the above-mentioned first image in a superimposed manner, a luminance range adjustment block configured to adjust a luminance range of at least one of the above-mentioned first image and the above-mentioned second image in accordance with a predetermined rule, and an output value computation block configured to execute alpha blending processing by use of data of the image adjusted in the luminance range so as to generate data of a superimposed image, thereby outputting the generated data.

In carrying out the present invention and according to another aspect thereof, there is provided a superimposed image generation method. The superimposed image generation method has a step of acquiring data of a first image, a step of acquiring data of a second image to be displayed on the above-mentioned first image in a superimposed manner, a step of adjusting a luminance range of at least one of the above-mentioned first image and the above-mentioned second image in accordance with a predetermined rule stored in a memory, and a step of executing alpha blending processing by use of data of the image adjusted in the luminance range so as to generate data of a superimposed image, thereby outputting the generated data to a display apparatus.

It should be noted that any combinations of the components mentioned above and those obtained by converting the expression of the present invention between a method, an apparatus, a system, a computer program, and a recording medium recording a computer program are also valid as embodiments of the present invention.

Effect of the Invention

According to the present invention, two or more images can be displayed in a superimposed manner with good balance regardless of the difference between luminance ranges.

BRIEF DESCRIPTION OF DRAWINGS

FIG. 13 is a diagram for describing a manner of executing luminance range adjustment on a part of an image according to the present embodiment.

DESCRIPTION OF EMBODIMENT

Figure 1:
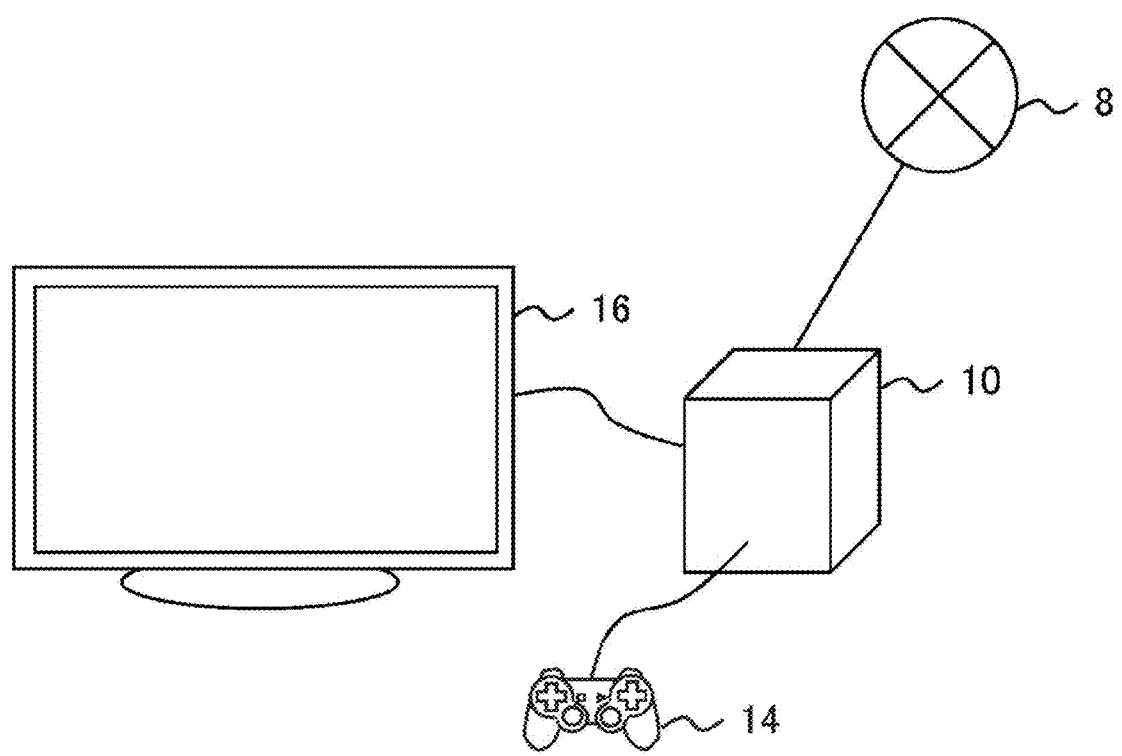
FIG. 1 is a diagram illustrating a configurational example of an information processing system according to the present embodiment.

Now, referring to FIG. 1, there is depicted a configurational example of an information processing system according to the present embodiment. This information processing system has an information processing apparatus 10, an input apparatus 14, and a display apparatus 16. As illustrated, the information processing apparatus 10 may be connectable with a server or the like providing various kinds of content via a network 8 such as the Internet. The input apparatus 14 may be a user-operable general-purpose input apparatus such as a controller, a keyboard, a mouse, a joystick or a touchpad, in addition to an image-taking apparatus of taking images of a real world such as a user, a microphone for picking up audio data, a sensor for detecting various kinds of physical values or any combination thereof.

The display apparatus 16 is realized by a liquid crystal display, a plasma display, or an organic EL (Electroluminescence) display that is configured to display images. Further, the display apparatus 16 may have a speaker through which audio data is outputted. The input apparatus 14 and the display apparatus 16 may be connected to the information processing apparatus 10 with a cable or in a wireless manner by use of LAN (Local Area Network) or the like. It should be noted that the external shapes of the input apparatus 14, the display apparatus 16, and the information processing apparatus 10 are not limited to those illustrated; for example, two or three thereof may be formed in an integral manner.

The information processing apparatus 10 receives a signal related with a user manipulation from the input apparatus 14, executes the corresponding processing on the signal so as to generate the data of a display image, and outputs the generated data to the display apparatus 16. The information processing apparatus 10 may be any one of a game machine, a personal computer, a tablet terminal, a mobile terminal, and a mobile telephone. In accordance with a form of the information processing apparatus 10 as described above and an application selected by a user, the contents of the processing to be executed by the information processing apparatus 10 may be various.

For example, the information processing apparatus 10 makes an electronic game specified by the user go on in accordance with a user manipulation and generates the data of a game screen thereof with a predetermined frame rate, thereby outputting the generated data. Alternatively, the data of moving images may be acquired from a server via the network 8 that is sequentially decoded for output. Thus, the purpose of use of the information processing apparatus 10 may be various and the contents of the information processing to be executed accordingly are different from each other, so that detailed description is skipped. The following mainly describes a technique of displaying such two or more images in a superimposed manner as images generated as a result of the above-mentioned information processing or images representative of the information to be presented.

Figure 2:
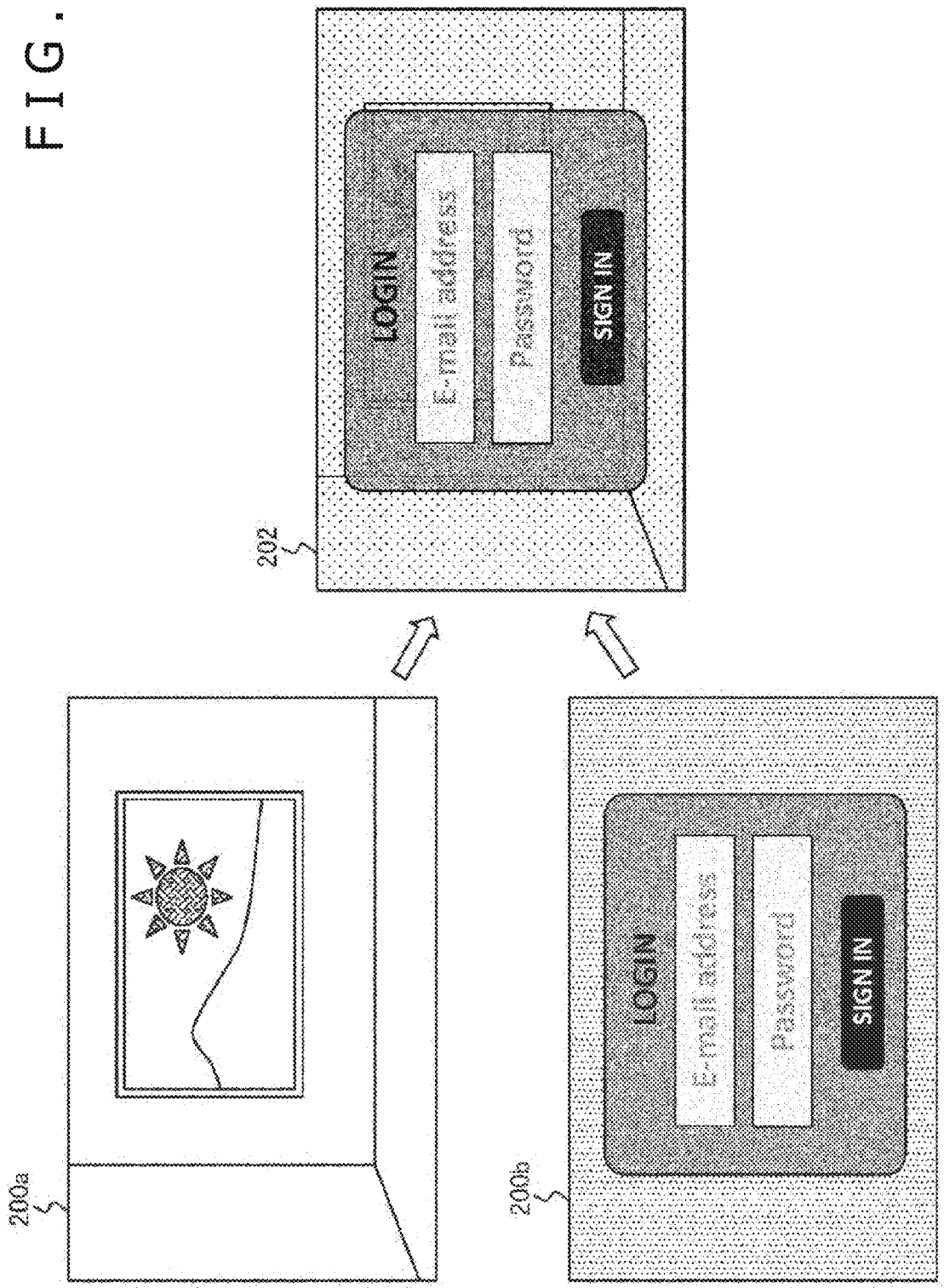
FIG. 2 is a diagram schematically illustrating images that are generated by an information processing apparatus according to the present embodiment.

Referring to FIG. 2, there is depicted a diagram schematically illustrating images that are generated by the information processing apparatus 10 according to the present embodiment. An image 200a is an image that is mainly displayed in a game or a moving image, for example. An image 200b is an image that is displayed as required, an example thereof including a dialog box through which a user inputs the address and password thereof for login. When it is required to display the above-mentioned dialog box, the information processing apparatus 10 superimposes the image 200b including the dialog box onto the image 200a so as to generate and output a display image 202.

Making the image 200a be seen through via the image 200b in a region as wide as possible allows the displaying of necessary information without interrupting a world view of the image 200a such as a game or a moving image. In addition, temporally changing the transparency of the image 200b can provide the performance of making the dialog box gradually appear or disappear.

Other various examples than that of the case in which two or more images are displayed in a superimposed manner may be understood by those skilled in the art. In the case of a racing game for example, it may be conceptualized that an image indicative of a bird's eye view of an entire course is additionally displayed to a main image indicative of driver's field of view. In the case of displaying a movie, it may be conceptualized that an image indicative of bibliographic information such as a plot and performers and manipulation panels of such as playback, pause, and fast are additionally displayed. In accordance with situations and display contents, the position, area, and period with regard to the superimposition may be various.

In what follows, an image, as with the image 200a, that is positioned in the background at the time of superimposition is referred to as a first image; an image, as with the image 200b, that is positioned in the foreground at the time of superimposition is referred to as a second image. However, the principles of operation to be described below holds true if three or more images are displayed in a superimposed manner. In order to display images in a superimposed manner by providing transparency as described above, luminance $F_{out}$ of each pixel of the display image 202 is determined by alpha blending basically expressed by the following equation.

$$F_{out}=(1-\alpha)Fb_1+\alpha Fb_2 \qquad \text{(Equation 1)}$$

where, $Fb_1$ and $Fb_2$ are luminance of the pixel concerned in the first image and the second image, respectively, and $\alpha$ is a general $\alpha$ value set to the pixel concerned of the second image, namely, a value indicative of transparency, from 0 to 1.0. It should be noted that, in the case of an RGB (Red, Green, Blue) image, luminance $Fb_1$ and $Fb_2$ are set to each of the three channels concerned; here, the luminance of the three channels are generically referred to as luminance $Fb_1$ and $Fb_2$. For example, varying the $\alpha$ value in an entire image from 0 to 1, the color of the second image gradually darkens from the state in which only the first image is displayed, finally displaying the second image in opaqueness. Setting the $\alpha$ value to an intermediate value that is larger than 0 and smaller than 1 makes the second image translucent, thereby making the first image be seen transparently.

Figure 3:
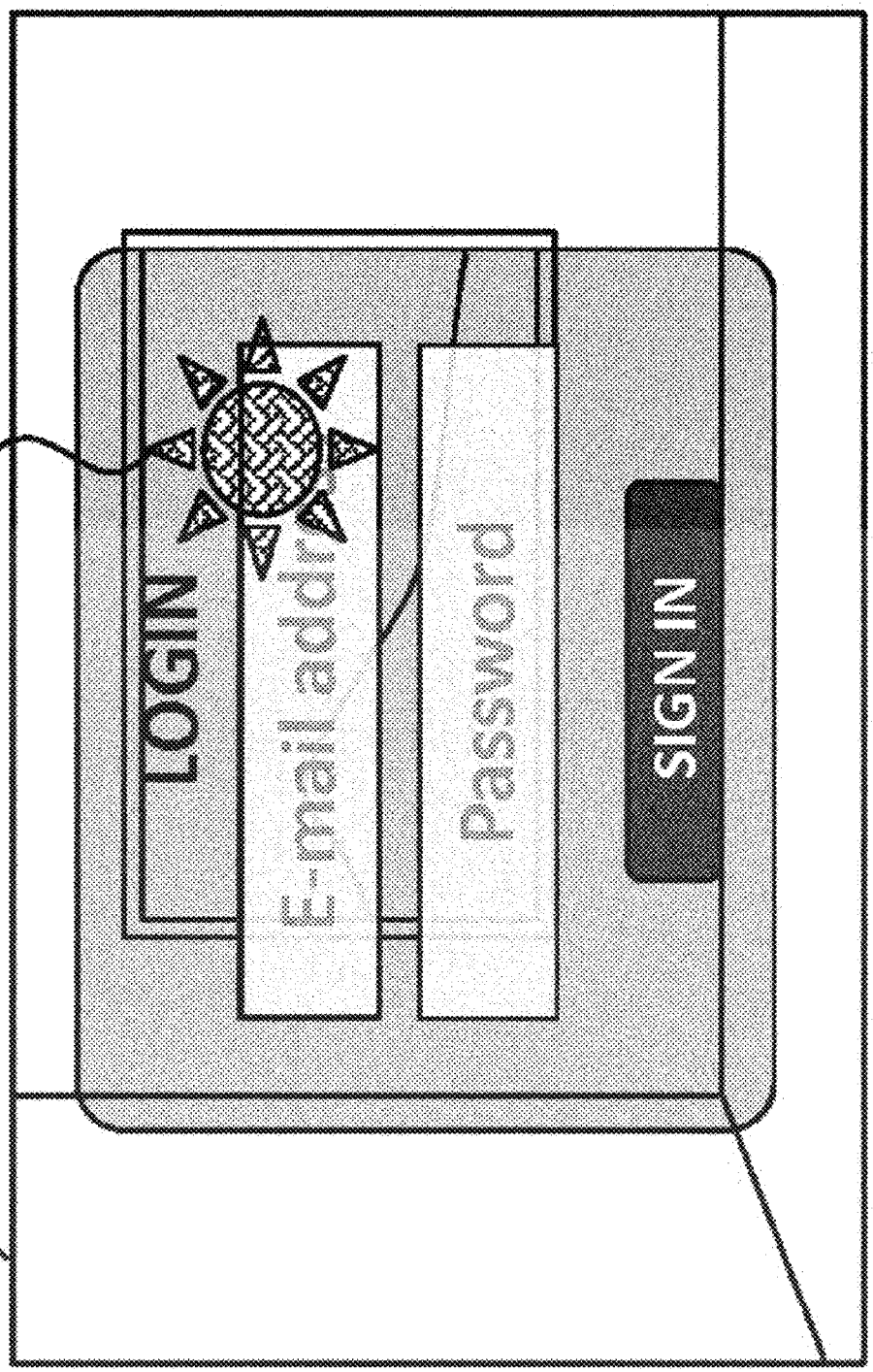
FIG. 3 is a diagram schematically illustrating a display image that may be generated if the luminance ranges of a first image and a second image are largely different from each other in superimposition processing illustrated in FIG. 2.

FIG. 3 schematically illustrates a display image that may be generated if the luminance ranges of the first image and the second image are largely different from each other in the superimposition processing illustrated in FIG. 2. For example, if the first image is drawn in HDR and the second image in SDR, it may be considered that the luminance of the former $Fb_1$ becomes 100 or more times higher than the luminance of the latter $Fb_2$. In this case, unless $\alpha$ is set to 1.0, the first term of equation 1 is dominant, thereby possibly failing the representation of the intended translucence. For example, even if the intense white represented by the maximum luminance ($Fb_1=10000$ nit) is composed by the black ($Fb_2=0$ nit) on the first image with a ratio of 1:99 ($\alpha=0.01$), $F_{out}=100$ nit, so that the pixel concerned in an output image takes color that is far from black.

Hence, as illustrated in the display image 204, even if the second image is set to a level near opaqueness, a sun 206 having high luminance in the first image, for example, may possibly be seen dominant. As a result, it is possible that the second image is hard to see or displayed letters become scarcely readable. In addition, making the second image be nearer as possible for easier visual recognition denotes going away from the transparency desired as image representation.

Further, a slight change in α value causes a problem of a large change in the luminance of a display image. For example, as with described above, if the intense white ($Fb_1=10000$ nit) of the first image is superimposed with the black ($Fb_2=0$ nit) of the second image, even a change as slight as 0.01 of α value results in a change of 100 nit in luminance $F_{out}$ of the display image.

Hence, also in the case where gradation is represented by gradually changing α value on an image plane or an image is cross-faded by a temporal change of α value, a smooth change may not be realized. Especially, to a change of α value from 0.99 to 1.0, a drastic change from white to black or the like will take place on the display image.

It should be noted that, even if the second image is generated with a luminance range of HDR and if the luminance range of a region in which letters and diagrams to be shown more clearly are represented is as small as SDR, then the same situation as described above takes place. Therefore, in the present embodiment, in displaying two or more images in a superimposed manner by alpha blending, the luminance range of the images are adjusted in accordance with α value so as to realize the originally intended image representation.

Figure 4:
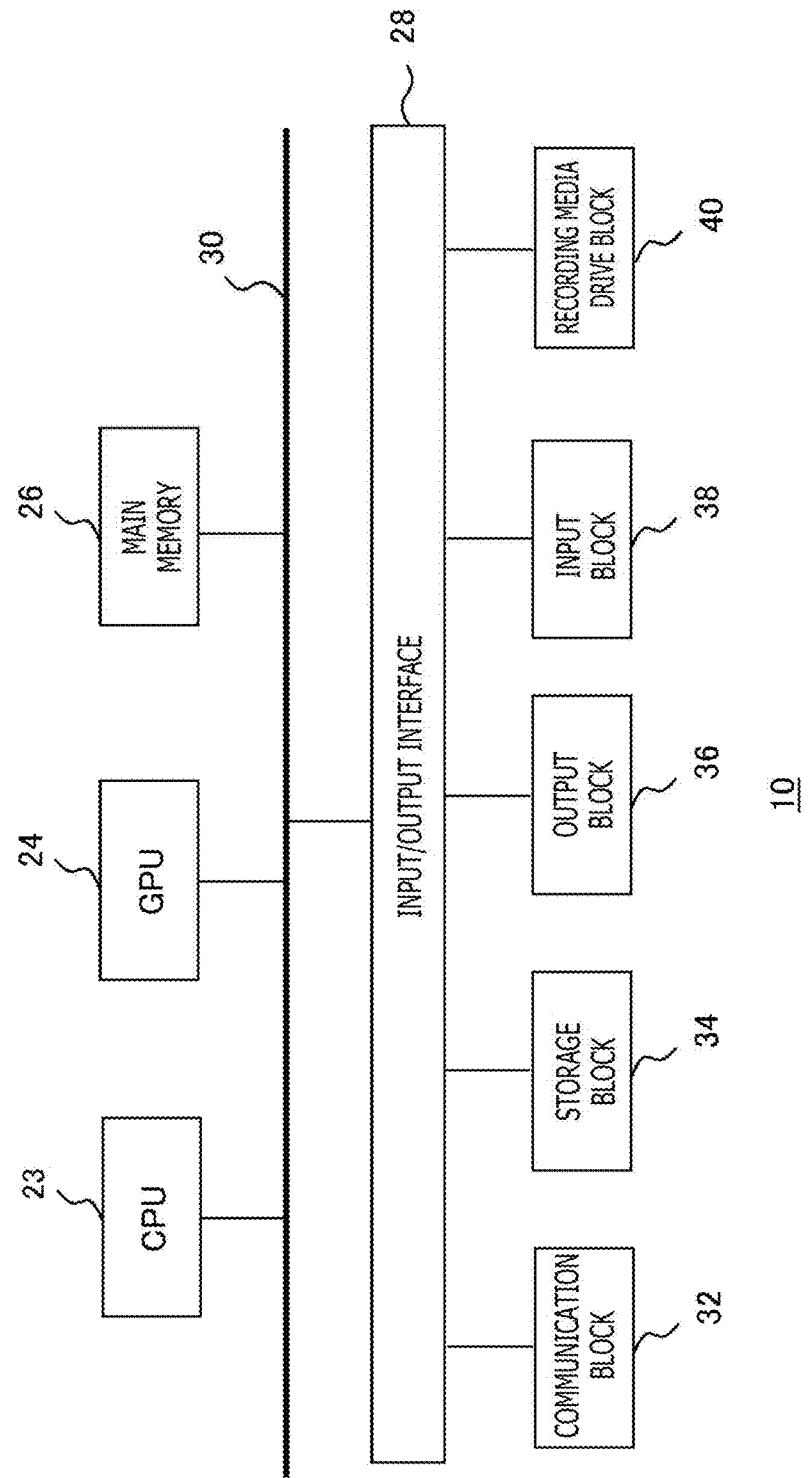
FIG. 4 is a diagram illustrating an internal circuit configuration of the information processing apparatus according to the present embodiment.

Referring to FIG. 4, there is depicted a diagram illustrating an internal circuit configuration of the information processing apparatus 10. The information processing apparatus 10 has a CPU (Central Processing Unit) 23, a GPU (Graphics Processing Unit) 24, and a main memory 26. These components are interconnected via a bus 30. The bus 30 is further connected to an input/output interface 28. The input/output interface 28 is connected with the interfaces of peripheral devices such as a USB (Universal Serial Bus) and an IEEE (Institute of Electrical and Electronics Engineers) 1394, a communication block 32 made up of wired or wireless LAN network interface, a storage block 34 such as a hard disc drive or a non-volatile memory, an output block 36 for outputting data to the display apparatus 16, an input block 38 through which data is inputted from the input apparatus 14, and a recording media drive block 40 for driving removable recording media such as a magnetic disc, an optical disc, or a semiconductor memory.

The CPU 23 controls the entire information processing apparatus 10 by executing the operating system stored in the storage block 34. In addition, the CPU 23 executes various programs read from a removable recording medium and loaded into the main memory 26 or downloaded via the communication block 32. The communication block 32 may establish communication with an external apparatus such as a server via the network 8, thereby acquiring the data of electronic content such as moving images and send the data generated inside the information processing apparatus 10.

The GPU 24 has a geometry engine function and a rendering processor function and executes drawing processing in accordance with drawing commands from the CPU 23, thereby storing the data of a display image into a frame buffer not depicted. Then, the display image stored in the frame buffer is converted into a video signal which is outputted to the output block 36. The main memory 26, made up of a RAM (Random Access Memory), stores programs and data that are necessary for the execution of processing.

Figure 5:
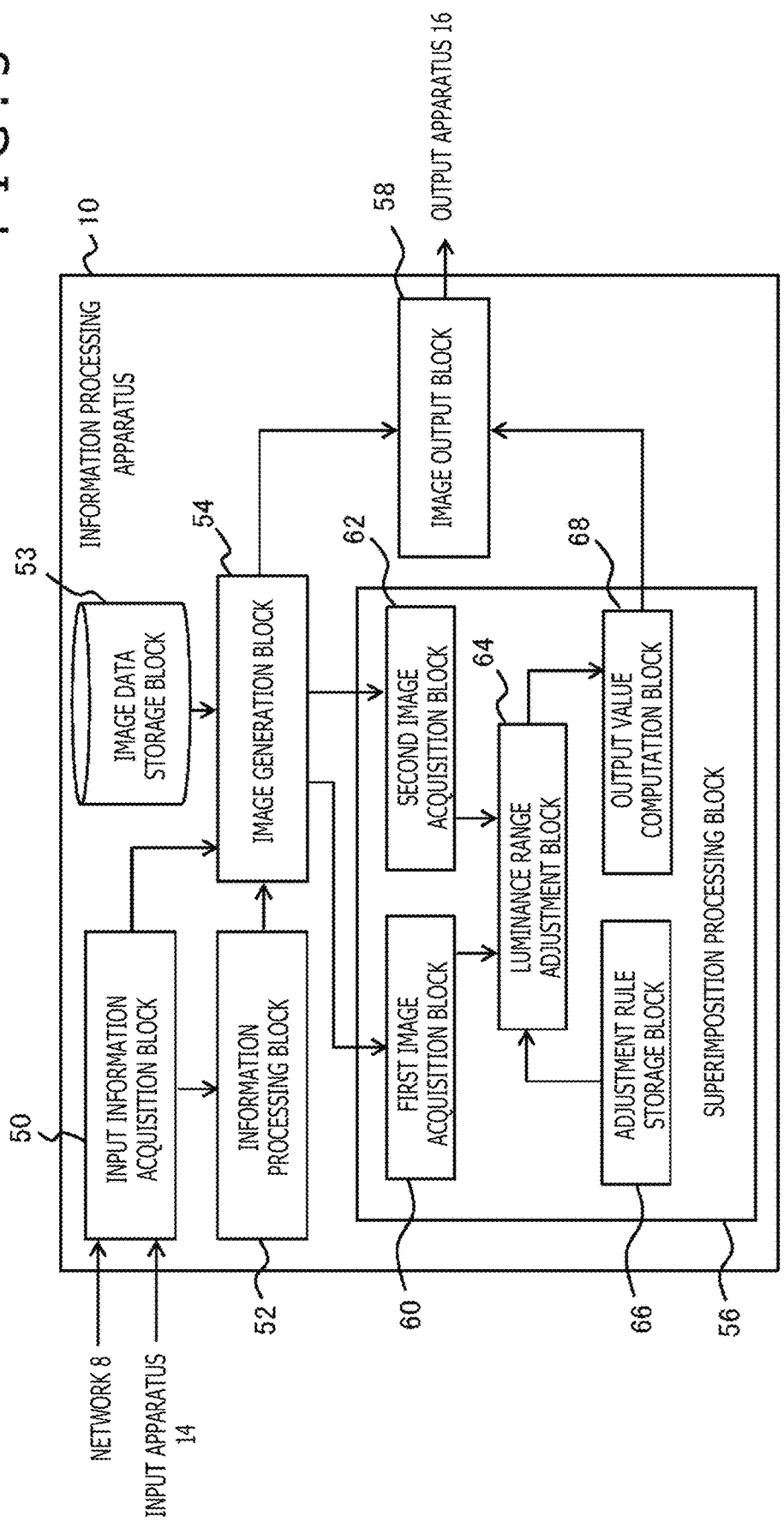
FIG. 5 is a diagram illustrating a configuration of the functional blocks of the information processing apparatus according to the present embodiment.

FIG. 5 illustrates a configuration of the functional blocks of the information processing apparatus 10. The functional blocks illustrated in FIG. 5 can be realized in a hardware approach by the CPU, GPU, memories, and data bus illustrated in FIG. 4; in a software approach, these functional blocks can be realized by such programs loaded from a recording medium into the memory as implementing a data input function, a data holding function, a computation function, an image processing function, a communication function, and so on. Therefore, that these functional blocks can be realized by only hardware, only software, combinations thereof, or in any other forms can be understood by those skilled in the art and therefore not limited thereto.

The information processing apparatus 10 has an input information acquisition block 50 for acquiring input information from the input apparatus 14, an information processing block 52 for executing information processing in accordance with a user manipulation in a game or the like, an image generation block 54 for generating data of an image to be displayed, an image data storage block 53 for storing data necessary for the generation of an image, a superimposition processing block 56 for superimposing two or more images with each other, and an image output block 58 for outputting the data of a display image to the display apparatus 16.

The input information acquisition block 50, realized by the input block 38 and the CPU 23, acquires the data indicative of the contents of a user manipulation from the input apparatus 14. Here, a user manipulation may be such manipulations by a user that are executed on a general-purpose information processing apparatus as the selection of an application to be executed or the content to be outputted, the starting or ending of processing, and the inputting of commands. If an image taking apparatus or any one of various sensors is introduced for the input apparatus 14, the input information acquisition block 50 may acquire the data of a taken image or detection results. In addition, the input information acquisition block 50 may acquire the data of electronic content such as a moving image from a server via the network 8. The input information acquisition block 50 supplies the acquired data to the information processing block 52 and the image generation block 54 from time to time.

The information processing block 52, realized by the CPU 23 and the main memory 26, executes information processing of a game and the like on the basis of the data supplied from the input information acquisition block 50. As described above, the processing to be executed by the information processing block 52 is not especially limited in the contents as far as the displaying of an image is involved. The image generation block 54, realized by the GPU 24 and the main memory 26, generates an image to be displayed in accordance with a request from the information processing block 52. For example, if the information processing block 52 executes a game, the image generation block 54 draws a game image in accordance with a user manipulation with a predetermined frame rate by use of the data stored in the image data storage block 53.

Alternatively, the data of a moving image specified by the information processing block 52 may be decoded and expanded. The moving image may be one acquired from an image taking apparatus that is the input apparatus 14, one distributed from a server via the network 8, or one stored in the image data storage block 53. Subsequently, a game image or a moving image generated as described above is referred to as a first image. Further, the image generation block 54 generates a second image as required. The second image may be one that is displayed from time to time on demand by a user or one that displayed with a timing determined by the information processing block 52 in accordance with the progress of a game or a moving image. Alternatively, the second image may be one that is normally displayed in a corner for example of a screen.

For generating an image concerned, the data stored in the image data storage block 53 may be used or the data acquired by the input information acquisition block 50 from an external apparatus such as an image taking apparatus or a server may be used. Incidentally, the second image is an image that is displayed on the first image in a superimposed manner, in which the degree of display transparency is set by α value in advance. The α value may be set for each pixel or region or fixed for the entire image. Further, the setting concerned may be temporally changed.

During a period in which it is unnecessary for the second image to be superimposed, the image generation block 54 outputs the data of the generated first image to the image output block 58. During a period in which it is necessary for the second image to be superimposed, the image generation block 54 outputs the data of the first image and the second image to the superimposition processing block 56.

The superimposition processing block 56, realized by the CPU 23, the GPU 24, and the main memory 26, has a first image acquisition block 60 for acquiring the data of the first image, the second image acquisition block 62 for acquiring the data of the second image, the luminance range adjustment block 64 for adjusting luminance range, an adjustment rule storage block 66 for storing the adjustment rule of luminance range, and an output value computation block 68 for computing a pixel value of a display image resulted from the superimposition of the second image on the first image.

The first image acquisition block 60 and the second image acquisition block 62 acquire the data of the first image and the data of the second image respectively from the image generation block 54. As described above, the data of the second image includes the setting data of α value. On the basis of the setting of the α value concerned, the luminance range adjustment block 64 adjusts the luminance range of the first image, the luminance range of the second image, or the luminance ranges of both as required. Qualitatively, the luminance that is excessive in the entire or a part of the region is reduced so as to make the balance between the luminance levels of both be put in an intended state upon superimposition, allowing the visual recognition of required information at a glance. Here, the degree of this reduction is changed with the α value set to the second image.

For example, assume the case in which the luminance range of the first image is large and therefore may be a subject of adjustment. In the setting where α value is near 0, the center of gravity is possibly placed on the first image rather than the second image, so that the luminance range of the first image may not be reduced much. On the other hand, in the setting where α value is near 1, the center of gravity is possibly placed on the second image rather than the first image, so that the degree of the reduction in the luminance range of the first image is set large, thereby preventing the interference to the second image. Thus, estimating an intended balance through the setting of α value and accordingly adjusting the luminance range allow the necessary information to be surely presented without unnecessarily suppressing the high contrast realized on an image.

In the case where the first image and the second image have the luminance ranges approximately equal to each other or there is no need for suppressing the luminance in terms of expression, the adjustment processing may be skipped. Whether or not the adjustment is to be executed may be set for each image, each region, or each pixel. Such setting information is supplied by the image generation block 54 along with the data of the second image. The luminance range adjustment block 64 references the adjustment rule stored in the adjustment rule storage block 66 in advance so as to execute the adjustment. If two or more adjustment rules are stored, the image generation block 54 specifies any one of the rules or sends the notification of necessary parameters. A specific example of adjustment rules will be described later.

The output value computation block 68 executes alpha blending by use of the pixel values of the first image and the second image with the luminance ranges adjusted as required, thereby computing the pixel values of a display image. In the case of an RGB image, the computation is executed for each channel. The output value computation block 68 outputs the results of the computation to the image output block 58. The image output block 58, realized by the GPU 24, the main memory 26, and the output block 36, sequentially outputs, to the display apparatus 16, the data of the first image supplied from the image generation block 54 or the data of the image superimposed with the second image supplied from the superimposition processing block 56.

Consequently, an image superimposed with another image as required is displayed on a main image such as a game image or a moving image with an intended balance regardless of the original luminance range. It should be noted that the superimposition processing block 56 may be realized as an image processing apparatus that inputs the data of two types of images from the outside and externally outputs the data of the image obtained by superimposing these two types of images with each other. Alternatively, separate from an apparatus that processes a game or the like so as to generate the first image, an apparatus having the function of generating the second image and the function of the superimposition processing block 56 may be arranged as an image processing apparatus.

Figure 6:
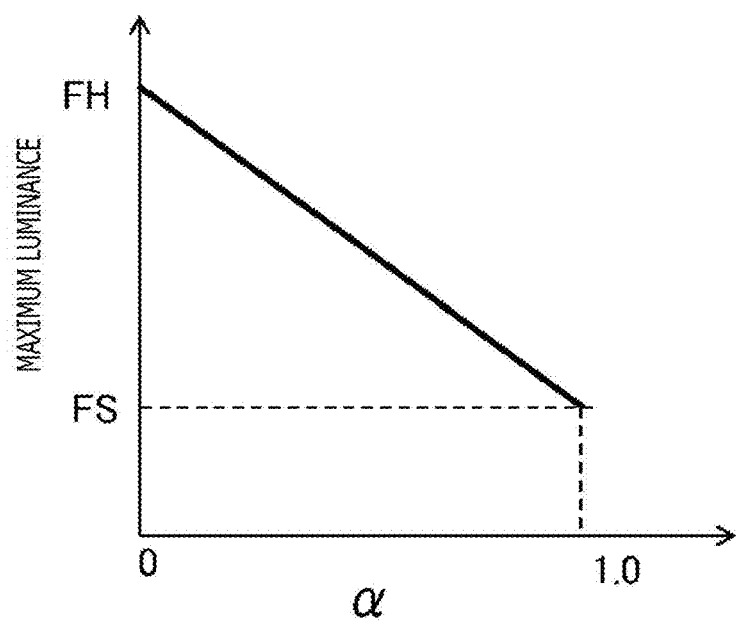
FIG. 6 is a diagram for qualitatively describing luminance range adjustment rules according to the present embodiment.

The following describes a technique of luminance range adjustment that is executed by the luminance range adjustment block 64. Referring to FIG. 6, there is depicted a diagram for qualitatively describing the luminance range adjustment rules. This diagram is a graph indicative of how to vary a maximum value of the luminance range of the first image relative to the α value of the second image in generating the first image with HDR and the second image with SDR, for one example. The vertical axis of the graph is representative of the maximum value luminance range, in which the maximum luminance of the HDR image is expressed by FH and the maximum luminance of the SDR image by FS.

The horizontal axis of the graph is indicative of the α value to be set to the second image, allowing the setting from 0 to 1.0. It should be noted that the maximum luminance FH and FS may be the maximum values of the luminance definable with each of HDR and SDR or the maximum values of the luminance actually given as a pixel value on each image. In the former, FH takes a value of 10000 nit, 1000 nit, or 2000 nit, and FS takes a value of 100 nit, 400 nit, or 280 nit. In description below, the same holds true.

As depicted in the above-mentioned graph, since the adjustment of luminance range is basically unnecessary if α=0, the maximum luminance becomes FH. Then, as the setting value of α gets larger, the maximum luminance gets smaller, so that the amount of adjustment is controlled such that the maximum luminance reaches FS when α=1.0. This setup allows the optimization of a luminance range such that the luminance range corresponds to the intended balance in visual recognition estimated from the setting of α value. In addition, in a mode where α value is gradually varied on an image plane or along the time axis, the smooth variation in transparency can be realized also with respect to displaying.

As described above, a conversion rule for uniquely determine the luminance after adjustment from the original luminance is determined in advance so as to vary the maximum luminance with α value. It should be noted that the illustrated example is illustrative only, being qualitatively indicative of the variation in the amount of adjustment relative to α value; namely, the variation in the actual maximum luminance is not limited. That is, in the above-mentioned graph, the maximum luminance is linearly decreased relative to α value; however, the maximum luminance may be a function of quadratic or higher of α or a discontinuous variation. For example, if it is found beforehand that α value is set to only 0.5 and 1.0 as required by the configuration of screen, only the conversion rule for the α value concerned may be set. Further, the conversion rules may be switched between the finite ranges of α value.

The adjustment of the luminance range by the luminance range adjustment block 64 and the alpha blending by the output value computation block 68 are collectively expressed by the following equation:

$$F_{out}=(1-\alpha)f(\alpha,Fb_1)+\alpha Fb_2 \quad \text{(Equation 2)}$$

Where, $Fb_1$ and $Fb_2$ are the luminance of the original pixels of the first image and the second image as with equation 1, f being indicative of a function for converting the luminance of the first image into the luminance after the adjustment. As described above, function f depends on the α value of the second image. For example, when α=0, namely, the second image is transparent, f is the original value, namely, $$f(0,Fb_1)=Fb_1.$$

When α=1, namely, the second image is opaque, then the f is a function that maximizes the amount of adjustment.

If both are HDR, it is possible that the first image and the second image are to be adjusted together. In this case, extending equation 2 allows the expression as follows:

$$F_{out}=(1-\alpha)f_1(\alpha,Fb_1)+\alpha f_2(\alpha,Fb_2) \quad \text{(Equation 3)}$$

where, $f_1$ is a function for converting the luminance of the first image and $f_2$ is a function for converting the luminance of the second image. According to equation 3, if there is an object having remarkably high luminance in either the first image or the second image, a situation in which another object having relatively low luminance cannot be seen as intended due to the interference of the object of remarkably high luminance at the time of superimposition can be avoided.

It should be noted that, in the present embodiment, the α value of the second image positioned foreground at the time of superimposition is focused, so that function $f_1$ is set such that the luminance range is narrowed relative to the increase in the α value as depicted in FIG. 6. On the other hand, conversely, function $f_2$ is set such that the luminance range is widened relative to the increase in the α value. Further, in a method of varying functions $f_1$ and $f_2$ relative to the original luminance $Fb_1$ and $Fb_2$, both may be the same or different depending on the purpose of superimposed display or the nature of images. By the same token, an equation of adjusting only the luminance range of the second image is as follows:

$$F_{out}=(1-\alpha)Fb_1+\alpha f(\alpha,Fb_2) \quad \text{(Equation 4)}$$

Figure 7:
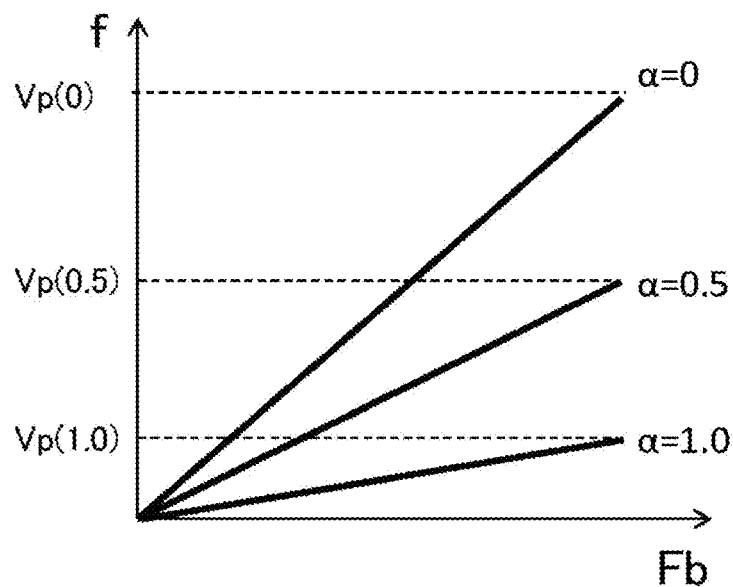
FIG. 7 is a diagram illustrating an example of function f for use in luminance conversion according to the present embodiment.

Referring to FIG. 7, there is depicted a diagram illustrating an example of function f for luminance conversion. As described above, function f is a function for uniquely determine the luminance after adjustment relative to the luminance $Fb_1$ and $Fb_2$ (hereafter generically referred to as luminance Fb) given as the pixel value of an image to be adjusted; in the example illustrated in this diagram, function f is linearly varied relative to luminance Fb. Further, function f is varied with the α value set to the second image as described above. In this diagram and in the description below, the case in which the first image is to be the subject of adjustment is assumed. Hence, as described with reference to FIG. 6, in this function, as the α value gets larger, the output range gets smaller.

That is, maximum value Vp(α) of function f has a variation as illustrated in FIG. 6. FIG. 7 illustrates function f at the time when α values are 0, 0.5, and 1.0, the maximum values Vp(0), Vp(0.5), and Vp(1.0) being the points on the graph illustrated in FIG. 6. At this moment, Vp(0)=FH and Vp(1.0)=FS. However, if it is considered that, when α=1.0, the luminance range may only be contained within the luminance range of SDR, the function may be defined as Vp(1.0)≤FS. In addition, Vp(0) and Vp(1.0) may be appropriately determined in accordance with the luminance range of the original image and the luminance range to be finally contained.

If Vp(α) is a linear function as illustrated in FIG. 6, function f illustrated in FIG. 7 is linearly decreased as α increases and is linearly increased relative to the original luminance Fb. To be more specific, function f can be expressed by the following equation.

[Math. 1]

$$f(\alpha, Fb) = \left((1-\alpha) + \frac{Vp(1.0)\alpha}{Vp(0)}\right) \cdot Fb \quad \text{(Equation 5)}$$

It should be noted that, if the second image is to be adjusted, rewriting α to 1−α for example can linearly decrease an output value as the α value increases. In FIG. 7, function $f(F_b)$ relative to the discrete values of α values is illustrated; however, use of equation 5 allows the luminance conversion for continuous α values. However, the form of function f is not limited thereto. That is, the adjustment rule storage block 66 may store function f as a mathematical expression of two variables of α and Fb as with equation 5 or store function $f(F_b)$ for each numerical range as a mathematical expression or the form of a table.

It should be noted that, in the description referencing FIG. 7 and subsequent description, the luminance range before and after adjustment uses 0 as the minimum value; however, with respect to the mounting, an offset value may be added to the luminance range. In this case, too, removal of the offset component results in the same concept as described above. Further, in the mounting where alpha blending is executed in a bit code space, the value for use in computation is not directly indicative of luminance; however, setting a proper function on the basis thereof allows the acquisition of the like effects.

In place of equation 5, a technology of tone mapping for converting the original image data into the luminance suitable for displaying may be applied. For example, one of the following equations is used for a tone map:

Example 1: N·Fb/(Fb+M)

Example 2: (N·Fb)/((M·Fb/V)+1)

where N an M may be constants or functions dependent on α. For example, if N=1, M(α)=α, then function f can be expressed as follows:

[Math. 2]

$$f(\alpha, Fb) = \frac{Fb}{\alpha \cdot \frac{Fb}{V} + 1} \quad \text{(Equation 6)}$$

Alternatively, when α=0, a tone map is used to provide a value obtained by interpolating the luminance after adjustment in accordance with the α value when α=0 and α=1.0 in the range of 0<α<1. That is, in 0<α<1, the following function f may be provided:

$$f(\alpha, Fb) = \alpha \cdot f(1.0, Fb) + (1-\alpha) \cdot f(0, Fb).$$

It should be note that, in any case, in use of a tone map, not only luminance Fb of a subject pixel but also the value after adjustment may be obtained by use of the luminance values of surrounding pixels. Also, an appropriate combination of a known tone map and the adjustment according to α value may be used. Further, the α value described so far may be replaced by a function of α value. For the function concerned, function A(α) to be described later may be introduced.

If, in equation 6, V=Vp(0) and luminance $Fb_1$ of the first image that is a subject pixel is 10000 nit and luminance $Fb_2$ of the second image is 50 nit, then the luminance of the first image after adjustment is 10000 nit for α=0, 196.1 nit for α=0.5, and 99.0 nit for α=1.0. As a result, luminance $F_{out}$ after alpha blending is 10000 nit for α=0, 123 nit for α=0.5, and 50 nit for α=1.0 according to equation 2.

Further, if example 2 is applied in a range (α>0.1 for example) of the α values to be used and f(0, Fb)=Fb in α=0, then, in the pixel composition described above, 10000 nit is obtained when α=0, 99.0 nit when α=0.5, and 99.0 nit when α=1.0. As a result, luminance $F_{out}$ after alpha blending is 10000 nit when α=0, 75 nit when α=0.5, and 50 nit when α=1.0 according to equation 2.

Figure 8:
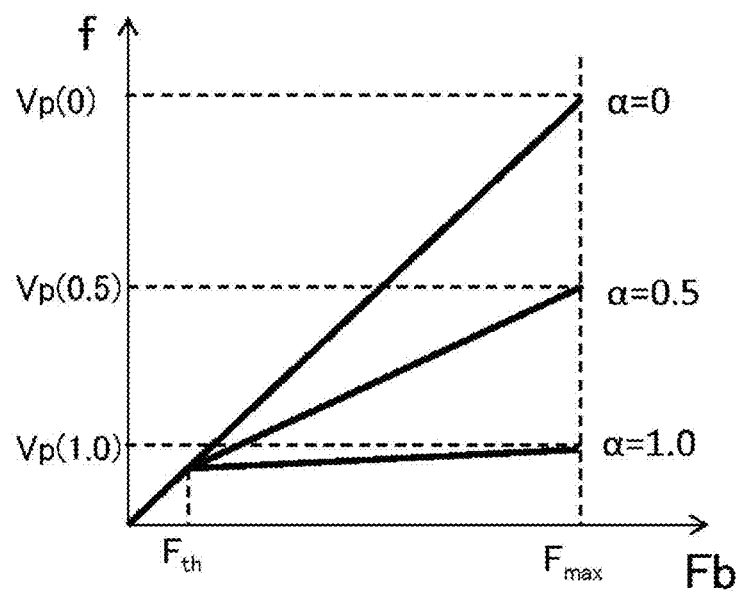
FIG. 8 is a diagram illustrating another example of function f for use in luminance conversion according to the present embodiment.

Referring to FIG. 8, there is depicted a diagram illustrating another example of function f for luminance conversion. In the example illustrated in FIG. 7, any α value provides a function in which an output value linearly increases in the entire range of original luminance Fb. That is, the original luminance Fb is the luminance after the adjustment of the value obtained by reducing with a ratio specified by α. On the other hand, it is possible that whether or not the adjustment is to be executed or the function f is differentiated for each luminance block obtained by dividing the range of original luminance Fb.

In the example illustrated in FIG. 8, the range (0, $F_{max}$) of the original luminance Fb is divided by threshold value $F_{th}$ into two luminance blocks. Then, without executing the adjustment of luminance in the luminance block of 0≤Fb≤$F_{th}$, the luminance is reduced with a ratio specified by the α value in the same manner as illustrated in FIG. 7 in the luminance block of $F_{th}$<Fb≤$F_{max}$. At this time, too, if the maximum value V(α) of function f satisfies such a condition as illustrated in FIG. 6, the luminance range can be suppressed down to a target value.

Thus, for luminance Fb of the range of such a degree of SDR as not to hamper the visibility after superimposition, the adjustment more than necessary can be avoided by keeping the original value. It should be noted that the number of divisions of the luminance range is not limited to two. Further, in addition to the switching between the execution and non-execution of adjustment for each luminance block, the functions f for specifying conversion rules may be switched. For example, with the function f determined by another method to be described later being a candidate of introduction, an optimum function may be selected for each luminance block.

It should be noted that, especially when combining the functions f determined by different methods, a luminance block for linear or curve interpolation may be arranged so as to continuously vary function f relative to luminance Fb. This arrangement can prevent the generation of a large difference between the luminance after adjustment in the vicinity of the boundary between the luminance blocks.

Figure 9:
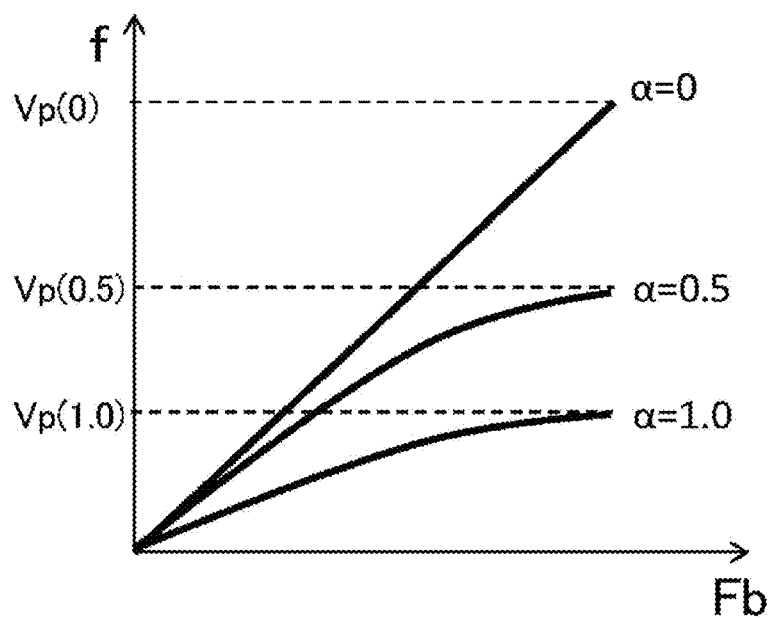
FIG. 9 is a diagram illustrating still another example of function f for use in luminance conversion according to the present embodiment.

Referring to FIG. 9, there is depicted a diagram illustrating still another example of the function f for luminance conversion. In this example, within a range of 0<α, a variation relative to the original luminance Fb is a curve. At this moment, the maximum value Vp(α) of function f may be the same as described with reference to FIG. 7. After determining the maximum value Vp relative to α value as described, a curve is determined relative to the range of luminance Fb. For example, function f at the time of α=1.0 is assumed to be a gamma curve, namely a power function that passes Vp(1.0), and, within a range of 0<α<1.0, a curve in which function f(Fb)=Fb when α is 0 and the gamma curve concerned are interpolated with a predetermined rule. At this moment, providing a curve based on the rules assumed for the color space conversion, such as BT.709 and BT.2020, allows the suppression of the color distortion in an adjusted image.

Figure 10:
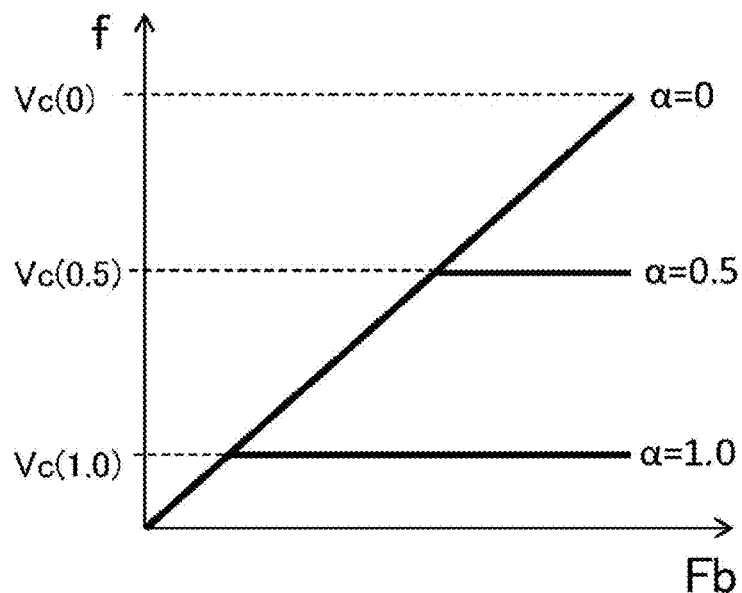
FIG. 10 is a diagram illustrating yet another example of function f for use in luminance conversion according to the present embodiment.

Referring to FIG. 10, there is depicted a diagram illustrating a yet another example of the function f for luminance conversion in which a method of converting the luminance equal to or higher than a predetermined value into predetermined value concerned, namely, suppressing (or clamping) the predetermined value converted as the upper limit is indicated. The function f at this moment can be expressed as follows:

$$f(\alpha, Fb) = \min(Vc(\alpha), Fb) \quad \text{(Equation 7)}$$

where, Vc(α) is the upper limit of the luminance after adjustment, being determined in accordance with the α value. In the diagram, the upper limit at the time of α=0, 0.5, and 1.0 is expressed as Vc(0), Vc(0.5), and Vc(1.0).

For example, if the luminance range of an HDR image is reduced to the luminance range of SDR, Vc(0)=FH and Vc(1.0)=FS are set. However, if restraint conditions are considered that, when α=0, the luminance range is not adjusted and, when α=1.0, the luminance is contained within the SDR luminance range, the definition may be made by the following conditions:

$$Vc(0) \geq FH$$

$$Vc(1.0) \leq FS$$

Then, $Vc(\alpha)$ is set so as to satisfy the conditions mentioned above within the range of $0 \le \alpha \le 1$. For example, $Vc(\alpha)$ is defined as follows:

$$Vc(\alpha)=Vc(0)-A(\alpha)\cdot(Vc(0)-Vc(1.0)) \quad \text{(Equation 8)}$$

where, $A(\alpha)$ is a monotonically increasing function that satisfies $A(0)=0$ and $A(1.0)=1.0$. That is, a value obtained by executing weighted average on $Vc(0)$ and $Vc(1.0)$ by the weight depending on $\alpha$ according to equation 7 becomes $Vc(\alpha)$. By this definition, the upper limit $Vc(\alpha)$ in accordance with $\alpha$ value is determined and therefore the clamping of luminance with a degree in accordance with $\alpha$ value can be provided in accordance with equation 7.

Function $A(\alpha)$ is appropriately determined in accordance with the contents of an actual image or the purpose of the composition thereof. That is, since function $A(\alpha)$ is an element for determining how much the pixel of high luminance should be clamped in an intermediate value of $\alpha$, it is desired to optimize the function from the viewpoint whether a desired effect can be achieved by gradually varying the $\alpha$ value in addition to the ease of visual recognition of an image to be actually displayed. The following definitions can be considered for function $A(\alpha)$:

Example 1: $A(\alpha)=\alpha$;
Example 2: $A(\alpha)=\alpha^2$; and
Example 3: $A(\alpha)=1-(1-\alpha)^2$.

Alternatively, $\alpha$ may be replaced by function $B(\alpha)$ of $\alpha$ in the examples 1 to 3 mentioned above. However, function $B(\alpha)$ is a monotonically increasing function that satisfies $B(0)=0$ and $B(1.0)=1.0$. For example, use of function $B(\alpha)$ in place of example 2 mentioned above, equation 8 is expressed as follows:

$$Vc(\alpha)=Vc(0)-B(\alpha)^2\cdot(Vc(0)-Vc(1.0)).$$

Function $B(\alpha)$ may be defined as follows:
Example 4: when $0 \le \alpha \le a1, B(\alpha)=0$
a monotonically increasing function from 0 to 1.0 when $a1 < \alpha \le 1.0$.
Example 5: when $0 \le \alpha \le a2$, a monotonically increasing function from 0 to 1.0.
when $a2 < \alpha \le 1.0$, $B(\alpha)=1.0$.

According to example 4 mentioned above, the adjustment results in which the upper limit of luminance does not vary due to the variation of $\alpha$ when $0 < \alpha \le a1$. According to example 5 mentioned above, the adjustment results in which the upper limit of luminance does not vary due to the variation of $\alpha$ when $a2 < \alpha \le 1.0$.

Figure 11:
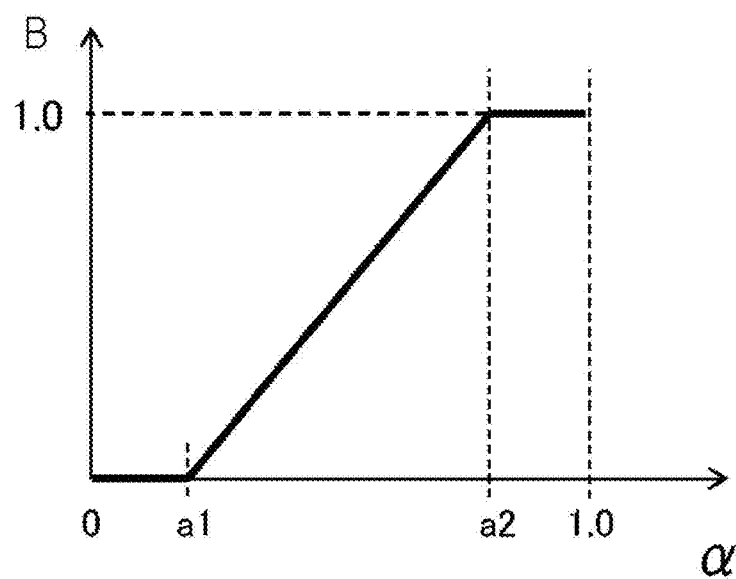
FIG. 11 is a diagram illustrating an example of function $B(\alpha)$ according to the present embodiment.

Referring to FIG. 11, there is depicted a diagram illustrating an example in which the above-mentioned examples 3 and 4 are combined as function $B(\alpha)$. That is, function $B(\alpha)$ is defined as follows:
Example 6: when $0 \le \alpha \le a1, B(\alpha)=0$.
when $a1 \le \alpha \le a2$, a monotonically increasing function from 0 to 1.0.
when $a2 < \alpha \le 1.0$, $B(\alpha)=1.0$.

For example, if $a1=0.2$ and $a2=0.5$, then $B(\alpha)=0$ in $\alpha \le 0.2$, so that $A(\alpha)=0$, resulting in $Vc(\alpha)=Vc(0)$; namely, no clamp occurs. In $\alpha>0.5$, $B(\alpha)=1.0$, so that $A(\alpha)=1$, resulting in $Vc(\alpha)=Vc(1.0)$; namely, the luminance is clamped to $Vc(1.0)$. It should be noted that function $B(\alpha)$ when $a1<\alpha \le a2$ is not limited to a linear function. In addition, this setting may be made on a discrete $\alpha$ value as described above.

Figure 12:
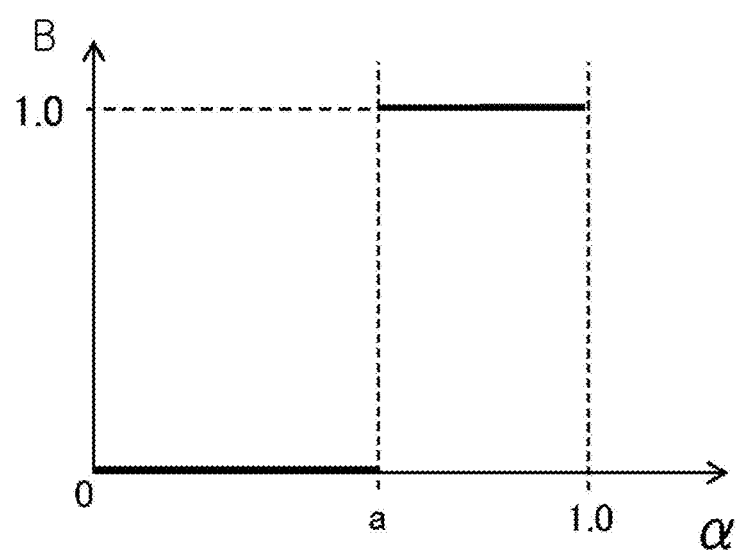
FIG. 12 is a diagram illustrating a variation of function $B(\alpha)$ according to the present embodiment.

Referring to FIG. 12, there is depicted a diagram illustrating function $B(\alpha)$ in the case where $a1=a2=a$ as a variation to example 5 mentioned above. That is, function $B(\alpha)$ is defined as follows:

Example 6': when $0 \le \alpha \le a, B(\alpha)=0$.
when $a < \alpha \le 1.0$, $B(\alpha)=1.0$.
Thus function $B(\alpha)$ itself may be discontinuously varied.
In this case, according to equation 8,
when $0 \le \alpha \le a$, $Vc(\alpha)=Vc(0)$.
when $a < \alpha \le 1.0$, $Vc(\alpha)=Vc(1.0)$.
Only when the $\alpha$ value is larger than a, a mode is realized in which the luminance is clamped to $Vc(1.0)$.

In equation 8, various combinations of $Vc(0)$, $Vc(1.0)$, $A(\alpha)$, and $B(\alpha)$ from the candidates as described above can optimize the upper limit of luminance in accordance with situations. For example, when example 1 mentioned above is employed as $Vc(0)=FH=10000$ nit, $Vc(1.0)=FS=100$ nit, and function $A(\alpha)$, the upper limit $Vc(0.5)$ of the luminance after adjustment when $\alpha=0.5$ is 5050 nit from equation 7. As a result, the luminance after adjustment relative to luminance Fb of the original image can be determined by the following function f:

$$f=\min(5050,Fb)$$

When example 3 is employed in place of example 1 mentioned above as function $A(\alpha)$, the upper limit $Vc(0.5)$ of the luminance after adjustment when $\alpha=0.5$ is 2575 from equation 8. As a result, the luminance after adjustment relative to luminance Fb of the original image can be determined by function f.

$$f=\min(2575,Fb)$$

It should be noted that the upper limit $Vc(\alpha)$ of the luminance after adjustment obtained from equation 8 by use of functions $A(\alpha)$ and $B(\alpha)$ illustrated so far can also be applied to the maximum value $Vp(\alpha)$ of each function illustrated in FIGS. 7 through 9. For example, when the maximum value $Vp(\alpha)$ is obtained as with equation 8 by use of discontinuous function $A(\alpha)$ illustrated in FIG. 12, two functions f are defined depending on whether or not the $\alpha$ value is below a.

As described above, the adjustment of a luminance range by the present embodiment is applicable to the entire first image or the second image or only a partial region thereof. FIG. 13 is a diagram for describing a mode of adjusting a luminance range on a part of an image. An image 300 in the upper is indicative of a second image to be superimposed on a first image such as a game image as described with reference to FIG. 2. In this example, the image 300 is made up of a region 302 including a character string display such as "E-mail address," a column in which a character string is inputted by a user, and GUI (Graphical User Interface) for establishing the input and a region 304 including a fill-out color and a pattern around the region.

In displaying this image 300 in a translucent manner, it may be considered that the region 302 is subject to the adjustment of luminance range, while the region 304 is out of the adjustment. At this time, the image generation block 54 generates a mask image 310 with the necessity or unnecessity of adjustment expressed by a pixel value as illustrated in the lower of this diagram, for example, thereby supplying the generated mask image to the superimposition processing block 56 along with the data of the second image. The luminance range adjustment block 64 of the superimposition processing block 56 executes the luminance range adjustment only on the region specified by the control entity 310.

Consequently, only the necessary parts can be adjusted in accordance with the configuration of an image. As a result, an intention in the image representation that the second image is superimposingly displayed in a translucent manner and the ease of visual recognition of information can go in a balanced manner. In addition, a luminance range can be adjusted also on a region that does not require detail understanding, thereby avoiding the damage of the world view expressed by the first image such as a game more than necessary. It should be noted that the mask image illustrated in FIG. 13 is a binary image for setting whether or not to adjust a luminance range; however, it is also practicable to make gradation larger, thereby using function f or various parameters thereof to be manipulated for each pixel.

According to the present embodiment described so far, in the image representation for simultaneously displaying two or more images in a superimposed manner, at least one luminance range is adjusted so as to avoid the occurrence of a remarkable difference in the luminance of superimposed pixels. This setup provides the balanced composition by using the related-art alpha blending mechanism without change also when displaying an image having an extremely wide luminance range such as HDR.

For example, if an image for which it is general to be displayed in a comparatively low luminance level, such as a character string, is composed in a translucent manner on an image desired to be expressed in a real manner with a high contrast such as a taken image or a virtual world based on computer graphics, the latter image tends to be dominant. Therefore, in order to make a character string or the like easy to be visibly recognizable, it may be considered to lower transparency, which damages the originally intended effects of translucence. According to the present embodiment, the desired information can be visibly recognized at a glance, while the impression of an image based on translucence is kept.

Further, by varying the degree of adjustment in accordance with the α value for use in setting transparency or switching between adjustment and non-adjustment on an image plane or between adjustment techniques, the suppression of luminance more than necessary can be avoided, thereby keeping the world view of an image represented with a high contrast as long as possible. In the adjustment of luminance, by properly selecting a function with which the luminance after adjustment is uniquely determined relative to the original luminance, the optimum adjustment in accordance with the contents and configuration of the image and the purpose of composition thereof can be executed on a pixel basis. It is especially effective to control the adjustment with such a fine granularity as with a moving image in which, whether or not a figure of high luminance appears and, if found appearing, the position thereof changes according to situations.

While the embodiment of the present invention has been described using specific terms, such description is for illustrative purpose only, and it is to be understood by those skilled in the art that changes and variations may be made without departing from the spirit or scope of the claims of the present invention.

For example, in the present embodiment, an example of adjusting the range of luminance as the pixel values of three channels of RGB has been mainly described but the subject of range adjustment is not limited thereto; namely, any luminance component expressed by an image can be adjusted in range. Hence, the luminance range adjustment block 64 may execute at least one of the processing of converting a color space for range adjustment on an image to be adjusted and the processing of converting a color space for alpha blending after adjustment. For example, it is also practicable that the data of RGB indicative of the original image is converted into the data of luminance and color difference (YUV), the range of luminance (U) is adjusted to be returned to the RGB data, and then the processing of alpha blending is executed. This technique also achieves the same effects as those provided by the present embodiment.

REFERENCE SIGNS LIST

8 . . . Network, 10 . . . Information processing apparatus, 14 . . . Input apparatus, 16 . . . Display apparatus, 23 . . . CPU, 24 . . . GPU, 26 . . . Main memory, 50 . . . Input information acquisition block, 52 . . . Information processing block, 53 . . . Image data storage block, 54 . . . Image generation block, 56 . . . Superimposition processing block, 58 . . . Image output block, 60 . . . First image acquisition block, 62 . . . Second image acquisition block, 64 . . . Luminance range adjustment block, 66 . . . Adjustment rule storage block, 68 . . . Output value computation block

INDUSTRIAL APPLICABILITY

As described above, the present invention is applicable to various kinds of information processing apparatuses such as a game apparatus, an image processing apparatus, an image reproduction apparatus, and a personal computer, and an information processing system that includes any thereof.

The invention claimed is:
1. An image processing apparatus comprising:
a first image acquisition block configured to acquire data of a first image;
a second image acquisition block configured to acquire data of a second image to be displayed on the first image in a superimposed manner;
a luminance range adjustment block configured to adjust a luminance range of at least one of the first image and the second image in accordance with a predetermined rule; and
an output value computation block configured to execute alpha blending processing by use of data of the image adjusted in the luminance range so as to generate data of a superimposed image, thereby outputting the generated data, wherein at least one of:
(i) the luminance range adjustment block adjusts a luminance range in accordance with a preset conversion rule for converting original luminance into luminance after adjustment, the preset conversion rule changes in accordance with an alpha value set to the second image for the alpha blending processing; if luminance before adjustment is equal to or higher than a predetermined value, the preset conversion rule is set as a function with this predetermined value being luminance after adjustment; and as the preset conversion rule, the predetermined value is set as one of a linear function and a quadratic function of the alpha value;
(ii) of images subject to adjustment, the luminance range adjustment block switches between execution of luminance range adjustment and non-execution of luminance range adjustment depending on regions;
(iii) the luminance range adjustment block switches between execution of luminance range adjustment and non-execution of luminance range adjustment for each luminance block obtained by dividing a range of luminance before adjustment; and
(iv) the luminance range adjustment block switches between rules for adjustment for each luminance block obtained by dividing a range of luminance before adjustment.

2. The image processing apparatus according to claim 1, wherein, in the adjustment of the first image, the conversion rule for use in the adjustment changes so as to increase a degree of reduction in a luminance range at the time of the adjustment as the alpha value gets larger and, in the adjustment of the second image, the conversion rule for use in the adjustment changes so as to decrease a degree of reduction in a luminance range at the time of adjustment as the alpha value gets larger.

3. The image processing apparatus according to claim 1, wherein, in the conversion rule, a maximum value of luminance after adjustment is set as one of a linear function and a quadratic function of the alpha value.

4. The image processing apparatus according to claim 1, wherein the conversion rule is set as one of a linear function and a power function of luminance before adjustment.

5. The image processing apparatus according to claim 1, wherein, as the conversion rule, a value obtained by executing weighted average on a maximum value of a luminance range before and after adjustment with a weight depending on the alpha value is determined as the predetermined value.

6. The image processing apparatus according to claim 1, wherein, of images subject to adjustment, the luminance range adjustment block switches between rules for adjustment depending on regions.

7. A superimposed image generation method by an image processing apparatus, comprising:
acquiring data of a first image;
acquiring data of a second image to be displayed on the first image in a superimposed manner;
adjusting a luminance range of at least one of the first image and the second image in accordance with a predetermined rule stored in a memory; and
executing alpha blending processing by use of data of the image adjusted in the luminance range so as to generate data of a superimposed image, thereby outputting the generated data to a display apparatus, wherein at least one of:
(i) the adjusting the luminance range includes adjusting a luminance range in accordance with a preset conversion rule for converting original luminance into luminance after adjustment, the preset conversion rule changes in accordance with an alpha value set to the second image for the alpha blending processing; if luminance before adjustment is equal to or higher than a predetermined value, the preset conversion rule is set as a function with this predetermined value being luminance after adjustment; and as the preset conversion rule, the predetermined value is set as one of a linear function and a quadratic function of the alpha value;
(ii) of images subject to adjustment, the adjusting the luminance range includes switching between execution of luminance range adjustment and non-execution of luminance range adjustment depending on regions;
(iii) the adjusting the luminance range includes switching between execution of luminance range adjustment and non-execution of luminance range adjustment for each luminance block obtained by dividing a range of luminance before adjustment; and
(iv) the adjusting the luminance range includes switching s between rules for adjustment for each luminance block obtained by dividing a range of luminance before adjustment.

8. A non-transitory, computer readable storage medium containing a computer program, which when executed by a computer, causes the computer to supply data of a plurality of images from which a superimposed image is generated by alpha blending processing, an causes the computer to carry out actions, comprising:
acquiring data of a first image;
acquiring data of a second image to be displayed on the first image in a superimposed manner; and
adjusting a luminance range of at least one of the first image and the second image in accordance with a predetermined rule, thereby outputting data of both images, wherein at least one of:
(i) the adjusting the luminance range includes adjusting a luminance range in accordance with a preset conversion rule for converting original luminance into luminance after adjustment, the preset conversion rule changes in accordance with an alpha value set to the second image for the alpha blending processing; if luminance before adjustment is equal to or higher than a predetermined value, the preset conversion rule is set as a function with this predetermined value being luminance after adjustment; and as the preset conversion rule, the predetermined value is set as one of a linear function and a quadratic function of the alpha value;
(ii) of images subject to adjustment, the adjusting the luminance range includes switching between execution of luminance range adjustment and non-execution of luminance range adjustment depending on regions;
(iii) the adjusting the luminance range includes switching between execution of luminance range adjustment and non-execution of luminance range adjustment for each luminance block obtained by dividing a range of luminance before adjustment; and
(iv) the adjusting the luminance range includes switching s between rules for adjustment for each luminance block obtained by dividing a range of luminance before adjustment.

* * * * *